Patented May 11, 1937

2,079,925

UNITED STATES PATENT OFFICE 2,079,925

PROCESS OF TESTING THE TIGHTNESS OF PROTECTIVE COATINGS

Hans Reichert, Leverkusen-Wiesdorf, Germany, assignor to I. G. Farbenindustrie Aktiengesellschaft, Frankfort-on-the-Main, Germany No Drawing. Application April 16, 1934, Serial No. 720,914. In Germany April 19, 1933

12 Claims. (Cl. 23—230)

This invention relates to a process of testing the tightness of protective coatings by means of a chemical reaction, occurring under a color change, by which the tightness or untightness of the coating becomes visible.

Protective coatings of lead, tin, rubber etc., are widely used in industry. The most important feature of these coatings is their tightness. Hitherto no simple and cheap process for testing the tightness of coatings was known.

According to the present invention a process has been found which allows of rendering visible flawed places of the coating, as for example pores or cracks, even such pores or cracks which do not penetrate the coating completely but only part thereof. The process consists in bringing into the pores or cracks a chemical compound capable of yielding a color or color change with another chemical compound. To perform the process the object coated is thoroughly coated or painted with a solution of the first chemical compound which is allowed to remain on the object for some time, say, for instance, some hours. During this time the solution is introduced into all pores or cracks present. The object is then washed until the chemical compound is completely removed from the surface of the coated object and is then coated or painted with a second chemical compound which reacts with the first compound while yielding a color or a change in color. In the pores or cracks of the coating traces of the first chemical substance have remained due to the capillary forces. These traces of the first chemical compound now react with the second compound and thereby the pores or cracks become visible inasmuch as a color is formed or a change in color occurs. The untightness thus ascertained can easily be removed.

For performing the invention many chemical compounds can be used, especially dyestuff intermediate products which are transformed into dyestuffs by the second chemical compound. For instance, a solution of a coupling diazo compound, such as diazobenzene, can be brought into the coating, and after washing the object can be treated with a solution of a coupling component, such as aniline chlorhydrate. The cracks and pores are rendered visible by the formation of a yellow azodyestuff.

In an analogous manner leuco-bases are brought in solution on the coated object to be tested. The solution is washed off and the leuco base, for instance, leuco malachite green, remaining in the pores is developed in the known manner by oxidizing agents, such as hydrogen peroxide. Also in this case the pores and cracks are rendered visible by the formation of the dyestuff. In the same manner vat dyestuffs are brought on to the coating in the vatted state, for instance, vatted indigo, and the vat dyestuff is developed by oxidation.

Another mode for executing the process consists in coating or painting the coating with a soluble sulfide, such as sodium sulfide, washing off the sulfide after some time and treating the coating with a solution of lead acetate whereby the pores and cracks become visible as black spots and lines according to the formation of lead sulfide.

Though excellent results are obtained by applying the aforementioned methods I prefer for the sake of simplicity and cheapness to treat the coatings with an acid or a base and after washing apply a solution of a dyestuff which changes in color by coming into contact with an acid or a base. The dyestuffs coming into consideration for this purpose are the azodyestuffs of the Congo-red type. A lightening pigment may be added to the second chemical compound. As such a pigment lithopone, zinc oxide, titanium white or blanc fixe may be employed. It is understood that only such a pigment can be used which is indifferent to the chemical compounds used. Therefore, the addition of titanium dioxide being indifferent to dilute acids, bases and dyestuffs has proved most advantageous in all cases.

The addition of a white pigment is very advantageous since after drying the capillary forces of the intervals between the single pigment particles favorably influence the coming off of the compound contained in the pores and cracks so that the reaction sets in quickly.

The invention is further illustrated by the following example without being limited thereto:—

*Example.*—A homogeneously leaded object is painted with sulfuric acid, which latter is washed off after about 2 hours with a water jet. After drying, the object to be tested is painted with a Congo-red solution (compare Schultz, Farbstofftabellen 1923, No. 307), or with a titanium white suspension colored with Congo-red. After a short time the flawed places show a distinct blue coloration.

The Congo-red dyestuff may also be replaced by other dyestuffs which are not fast to acid, for instance by platinum blue V (compare Schultz, Farbstofftabellen 1923, No. 543).

I claim:—

1. A process of testing the tightness of protective coatings which comprises coating the protective coating with a solution of a chemical compound being able to yield a color with another chemical compound, removing the solution from the surface of the protective coating after some time and coating the surface of the protective coating with a solution of a chemical compound yielding a color with the first chemical compound.

2. A process of testing the tightness of protective coatings which comprises coating the protective coating with a solution of a dyestuff intermediate product, removing the solution of the dyestuff intermediate product after some time from the surface of the protective coating and coating the surface of the protective coating with a solution of a chemical compound by which the dyestuff intermediate product is converted into the dyestuff.

3. A process of testing the tightness of protective coatings which comprises coating the protective coating with a solution of a diazo compound, removing the solution of the diazo compound after some time from the surface of the protective coating and coating the surface of the protective coating with the solution of a coupling component.

4. A process of testing the tightness of protective coatings which comprises coating the protective coating with a solution of an organic dyestuff intermediate product of the group consisting of leuco-bases and vatted vat dyestuffs, removing the solution of the dyestuff intermediate product after some time from the surface of the protective coating and coating the surface of the protective coating with the solution of an oxidizing agent.

5. A process of testing the tightness of protective coatings which comprises coating the protective coating with a solution of a chemical compound of the group consisting of acids and bases, removing the solution of the chemical compound after some time from the surface of the protective coating and coating the surface of the protective coating with a solution of a dyestuff changing its color when coming into contact with the first chemical compound.

6. A process of testing the tightness of protective coatings which comprises coating the protective coating with dilute acid, removing the dilute acid after some time from the surface of the protective coating and coating the surface of the protective coating with a solution of Congo-red.

7. Process according to claim 1 in which the second solution contains a white pigment which is unattacked in the reaction.

8. Process according to claim 2 in which the second solution contains a white pigment which is unattacked in the reaction.

9. Process according to claim 3 in which the second solution contains a white pigment which is unattacked in the reaction.

10. Process according to claim 4 in which the second solution contains a white pigment which is unattacked in the reaction.

11. Process according to claim 5 in which the second solution contains a white pigment which is unattacked in the reaction.

12. Process according to claim 6 in which the second solution contains a white pigment which is unattacked in the reaction.

HANS REICHERT.